United States Patent [19]

Young

[11] 4,132,050
[45] Jan. 2, 1979

[54] POLYOLEFIN FILMS

[75] Inventor: Roger N. Young, Chesham, England

[73] Assignee: Imperial Chemical Industries Limited, London, England

[21] Appl. No.: 750,519

[22] Filed: Dec. 14, 1976

Related U.S. Application Data

[63] Continuation of Ser. No. 523,530, Nov. 13, 1974, now Defensive Publication No. T941,020.

[30] Foreign Application Priority Data

Dec. 21, 1973 [GB] United Kingdom ............... 59338/73

[51] Int. Cl.² .................. B32B 27/08; B32B 27/32; C08L 23/00; C08L 53/00
[52] U.S. Cl. ..................................... 53/463; 428/515; 428/516; 428/518; 260/897 A; 260/876 B
[58] Field of Search ............... 428/516, 500, 518, 515; 260/897 A, 876 B; 53/33

[56] References Cited

U.S. PATENT DOCUMENTS

| T941,020 | 12/1975 | Young | 428/349 |
|---|---|---|---|
| 3,524,795 | 8/1970 | Peterson | 428/516 X |
| 3,527,844 | 9/1970 | Hull et al. | 260/876 B |
| 3,539,439 | 10/1970 | Calderwood et al. | 428/518 X |
| 3,620,825 | 11/1971 | Lohmann et al. | 428/500 X |
| 3,622,375 | 11/1971 | Siebel et al. | 260/897 A X |

FOREIGN PATENT DOCUMENTS

| 45-16817 | 10/1970 | Japan | 260/897 A |
|---|---|---|---|
| 958079 | 5/1964 | United Kingdom | 260/876 B |
| 973932 | 11/1964 | United Kingdom | 260/876 B |

Primary Examiner—George F. Lesmes
Assistant Examiner—Alexander S. Thomas
Attorney, Agent, or Firm—Cushman, Darby & Cushman

[57] ABSTRACT

Heat sealable films exhibiting improved adhesion between a heat sealable layer and a film substrate wherein the substrate is formed from a blend of 87.5 to 60 parts of polypropylene and 12.5 to 40 parts of an ethylene-propylene block copolymer containing 0.5 to 40% by weight of ethylene, the blend containing from 0.2 to 5% by weight of ethylene.

14 Claims, 1 Drawing Figure

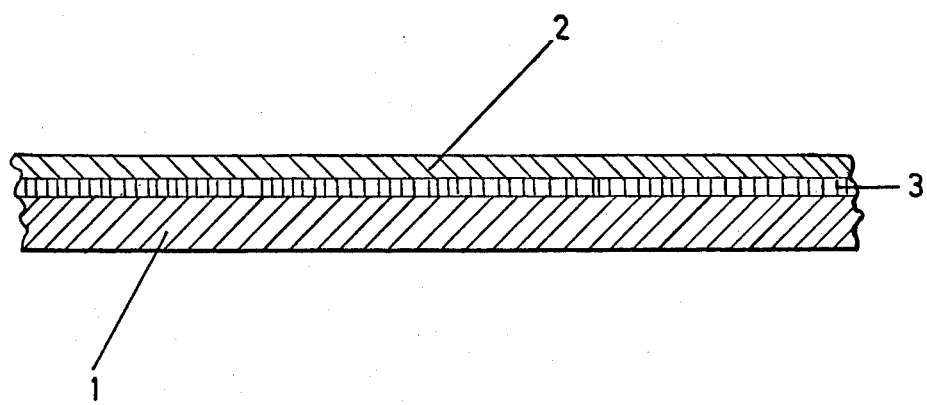

POLYOLEFIN FILMS

This is a continuation of application Ser. No. 523,530 filed Nov. 13, 1974, now Defensive Publication No. T941,020, the entire specification of which is hereby incorporated by reference.

This invention relates to polyolefin films, and, in particular, to a polyolefin film having a heat sealable coating on at least one surface thereof.

Polyolefin films are widely used as packaging materials for wrapping various kinds of merchandise, particularly for foodstuffs and other perishable commodities. Closure of a film package is conveniently effected by heat sealing appropriate areas of the film, and, in order to improve the heat sealing characteristics of a polyolefin film it is common practice to coat at least one surface of the film with a layer of a readily heat sealable material. To ensure that a package having an acceptably strong heat seal is formed it is essential that the heat sealable layer is firmly bonded to the polyolefin film substrate, and adhesion of the heat sealable layer to the substrate film is usually promoted by treating the latter with an intermediate anchor or primer coating and/or by subjecting the substrate to a chemical or physical treatment prior to application of the heat sealable layer.

We have now devised a heat sealable polyolefin film exhibiting improved adhesion between the heat sealable coating layer and the film substrate.

Accordingly, the present invention provides a heat sealable film comprising a polyolefin film substrate at least one surface of which is coated with a layer of a heat sealable material, as hereinafter defined, wherein the film substrate is formed from a composition comprising a blend of from 87.5 to 60 parts by weight of polypropylene and from 12.5 to 40 parts by weight of a block copolymer of ethylene and propylene, the copolymer containing from 0.5 to 40% by weight of ethylene, based on the weight of the copolymer, and the blend containing from 0.2 to 5% by weight of ethylene, based on the weight of the blend.

Polypropylene suitable for forming films according to the present invention is a crystalline and substantially isotactic polypropylene — for example, containing at least 80% by weight of isotactic polypropylene. The polymer is conveniently prepared by direct polymerisation of propylene in an inert hydrocarbon diluent in the presence of a stereospecific catalyst system, such as a titanium trichloride-aluminium diethylchloride catalyst, at reaction temperatures between 30° and 90° C., preferably between 50° and 75° C., the melt viscosity of the resultant polymer being controlled, if desired, by the introduction of gaseous hydrogen during the course of the reaction. On completion of polymerisation the resultant polymeric composition may be worked up by conventional methods — for example, by treatment with a suitable alcohol, such as isopropanol, to remove catalyst residues, followed by washing with water, filtration to remove the bulk of the diluent, steam distillation to remove the remaining diluent, and drying. The resultant powder is then densified — for example, by extrusion in granular form. Suitably the melt flow index of the granules, measured at 230° C. under a load of 2.16 kilogrammes, is from 4 to 8 g/10 minutes.

By a "block copolymer" we mean a material which is at least 90% insoluble in boiling diethyl ether resulting from a copolymerisation process in which at least two different monomers or monomer mixtures are contacted with a polymerisation catalyst in sequence.

A block copolymer of ethylene and propylene suitable for incorporation into the blends of the present invention is conveniently formed by sequential polymerisation of the respective monomers, feeding of the monomers being controlled so that the monomer employed in one stage of the sequential polymerisation is not added unitl the monomer employed in the preceding stage has been at least partially consumed, thereby ensuring that the concentration of the monomer remaining from that preceding stage is sufficiently low to prevent formation of an excessive proportion of soluble random compolymer. Desirably, however, the two monomers may be present together in the polymerisation zone for a certain time so that some degree of essentially random polymerisation may occur, thereby improving the mechanical properties of the resultant copolymer.

Preferably, the block copolymer is formed by a sequential polymerisation process involving only two stages — for example, a stage in which propylene is introduced into the polymerisation zone followed by a terminal stage in which either ethylene or a mixture of ethylene and propylene is introduced, thereby creating an end-block copolymer. The polymerisation is conveniently effected, in the presence of an inert hydrocarbon diluent, in a closed autoclave, gaseous hydrogen being introduced, if desired, to control the melt viscosity of the resultant copolymer.

A catalyst system suitable for use in preparing the block copolymer may conveniently be prepared by slowly adding aluminium ethyl sesquichloride to a stirred solution of titanium tetrachloride in an inert hydrocarbon at 0° C. over a period of several hours, the precipitate obtained being heated for a period in inert hydrocarbon at from 60° to 100° C. and subsequently washed with inert hydrocarbon to remove soluble by-products. Optionally this heating and washing step may be repeated one or more times, the temperature being increased each time but not being allowed to exceed 140° C.

Organo-aluminium compounds suitable for use as catalyst activators include aluminium trialkyls and triaryls, aluminium alkyl halides and aluminium alkyl hydrides. Aluminium dialkyl chlorides are particularly suitable.

On completion of the polymerisation reaction the block copolymer composition may be worked up by conventional techniques — for example, as hereinbefore described in relation to the recovery of polypropylene.

A particularly suitable method for producing the block copolymer is described in British patent No. 1,014,944 the disclosure of which, together with that of British patent No. 970,479 described therein, is incorporated herein by reference.

Blending of the polypropylene and ethylene-propylene block copolymer to provide the film-forming compositions of the present invention is suitably effected by conventional blending techniques. For example, appropriate quantities of the polymer and copolymer may be fed directly to an extruder by means of proportional feeders. Alternatively, blending may be carried out by tumbling the two components, together with any desired stabilisers or other additives, until they are thoroughly interspersed, and then densifying the blend by extrusion and subsequent cutting of the extrudate. Other methods known in the art — for example, milling, may be employed, if desired.

Formation of the blend is conveniently effected as described in British patent No. 958,079, the disclosure of which is incorporated herein by reference.

Films formed from the polymer blends of this invention exhibit an improved adhesion between the substrate and a subsequently applied heat sealable layer compared to that obtained with a propylene homopolymer substrate. In addition, an improvement in the strength of heat seals formed between sheets of films according to this invention is achieved in comparison to seals between sheets of the heat seal coated homopolymer film. However, increasing the content of ethylene in the blend is believed to be responsible for a deterioration in optical characteristics, such as clarity and haze, of films formed therefrom. Accordingly, the content of ethylene in the films of the present invention should not exceed 5% by weight of the blend. Preferably, the ethylene content should be within a range of from about 0.5 to about 2% by weight of the blend, and a preferred heat sealable film is therefore formed from a composition comprising a blend of from 75 to 85 parts by weight of polypropylene and from 25 to 15 parts by weight of a block copolymer of ethylene and propylene, the content of ethylene in the copolymer being from 2 to 14% by weight, and the content of ethylene in the blend being from 0.5 to 2.1% by weight. A particularly preferred composition comprises a blend of 80 parts by weight of polypropylene and 20 parts by weight of a block copolymer of ethylene and propylene, the content of ethylene in the copolymer being 5% by weight, and the content of ethylene in the blend being 1% by weight.

The term "heat sealable material" is used throughout this specification to define any polymer or copolymer which imparts heat sealability to the film substrate to which it is applied using standard heat sealing equipment (see, for example, H.P. Zade "Heat Sealing and High Frequency Welding of Plastics". Temple Press, London, 1959).

In producing heat sealable films according to this invention, we prefer to employ copolymers of vinylidene chloride with acrylonitrile as heat sealable coatings because they give hard coatings and good heat seal strengths, and are also resistant to moisture and have low gas permeability. It is particularly preferred to use copolymers containing between 80% and 95% by weight of vinylidene chloride and up to 20% by weight of acrylonitrile. These copolymers may contain other monomers such as acrylic acid, itaconic acid and methacrylic acid. The heat seal coating may be applied to the film as a solution or a dispersion, but the solvent or dispersant should not be such that it will dissolve any resin coating, for example, an anchor coating resin, already on the film. For economic reasons application as a dispersion is preferred.

If desired, the barrier properties of the film may be improved, possibly at the expense of heat sealing properties, by employing a polymeric coating having a high content of vinylidene chloride. For example, a vinylidene chloride-acrylonitrile copolymer coating containing at least 95% by weight of vinylidene chloride improves the resistance of the film to permeation by oxygen. Such coatings may be applied in the form of a dispersion.

Another useful heat sealable barrier coating comprises a copolymer of vinylidene chloride and an alkyl acrylate, such as methyl acrylate, a preferred copolymer comprising 90 parts by weight of vinylidene chloride and 10 parts by weight of methyl acrylate.

Other heat sealable polymeric coatings which may be applied as dispersions are polyvinyl acetate, partially hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, e.g. those containing not more than 4.0 molecular proportions of combined terephthalic acid to one molecular proportion of combined sebacic acid, copolymers of vinylidene chloride and vinyl chloride, copolymers of vinyl acetate with vinyl chloride,, copolymers of vinyl acetate with ethylene, and copolymers of vinyl chloride with ethylene.

The heat sealable coating polymer may be obtained in aqueous dispersion by grinding and dispersing it in water using a suitable emulsifying agent. It is, however, preferred to prepare such dispersions by polymerising the monomeric constituents of the coating polymer in aqueous emulsion using an emulsifying agent to keep the polymer formed in a dispersed state. It is preferred to use a cationic emulsifying agent since good antistatic properties, which are desirable, although not essential, are thereby conferred on the coated film, although some anionic emulsifying agents also confer antistatic properties on the film, and may thus be used in the preparation of the dispersion of the coating polymer.

The coating dispersion may contain additives other than surface active agents, for instance, antioxidants, dyes, pigments, lubricants, prodegradants, and ultraviolet light stabilizers. It is particularly useful to add slip and antiblocking agents.

As hereinbefore described, the adhesion of the heat sealable coating layer to the film substrate may be improved by the application of the substrate of an intermediate primer or anchor coating prior to deposition of the heat sealable layer. Suitable anchor coating resins may be prepared, as described in British patent No. 1,134,876, by condensing a monoaldehyde with an interpolymer of acrylamide or methacrylamide with at least one other unsaturated monomer, or, as described in British patent No. 1,174,328, by condensing a monoaldehyde with acrylamide or methacrylamide, and subsequently interpolymerising the condensation product with at least one other unsaturated monomer, the condensation reaction being effected in both cases in the presence of an alkanol containing from one to six carbon atoms.

A preferred anchor coating resin comprises a copolymer containing up to 90% by weight of styrene, up to 80% by weight of an alkyl acrylate, up to 15% by weight of methacrylic acid, and 5% to 25% by weight of acrylamide which has been condensed with a solution of formaldehyde in n-butanol containing from 0.2 to 3 equivalents of formaldehyde for each amide group in the copolymer.

A particularly useful anchor coating resin is a 50% solids solution of a copolymer resin containing 38.5 parts of styrene, 44 parts of ethyl acrylate, 2.5 parts of methacrylic acid, and 15 parts of acrylamide which has been condensed with 5.2 parts of formaldehyde in n-butanol.

The anchor coating resin may be applied to the film substrate as a dispersion or as a solution, preferably, to facilitate drying of the applied coating, from an organic vehicle — for example, an alcohol, or an aromatic hydrocarbon, such as xylene, or a mixture thereof.

The surface or surfaces of the film substrate to which an anchor coating resin is to be applied should first be subjected to a treatment to improve the bonding properties of that surface. This treatment may be a physical or chemical treatment which oxidises the film surface. Examples of suitable chemical treatments are to treat the surface of the film with oxidising agents such as chromic acid in sulphuric acid, or hot nitric acid, or to expose the surface to ozone. Alternatively the surface of the film may be exposed to corona discharge — for example, as described in British specification No. 715,914 to ionising radiation, or to a flame for a sufficient time to cause superficial oxidation but not long enough to cause distortion of its surface. The preferred treatment, because of its effectiveness and simplicity, is to expose the surface to a high voltage electric stress accompanied by corona discharge.

Films are suitably formed from the blends of this invention in any conventional manner, as, for example, by rolling, extruding, pressing, solvent casting or melt casting techniques, and are preferably oriented by stretching the film to impart strength thereto. A particularly suitable film is produced by melt extruding the blend in the form of a tube from an annular die, inflating the tube by the so called "bubble" process to introduce transverse orientation, and simultaneously elongating the tube longitudinally to orient the film in a lengthwise direction.

Accordingly, the present invention also provides a method of forming a biaxially oriented heat sealable film comprising melt extruding in the form of an annular tube, a composition comprising a blend of from 87.5 to 60 parts by weight of polypropylene and from 12.5 to 40 parts by weight of a block copolymer of ethylene and propylene, the copolymer containing from 0.5 to 40% by weight of ethylene, based on the weight of the copolymer, and the blend containing from 0.2 to 5% by weight of ethylene, based on the weight of the blend, cooling the extruded tube, reheating the extruded tube to its orienting temperature, expanding the reheated tube by the introduction of an inflating gas and simultaneously longitudinally orienting the inflated tube, slitting the resultant tubular film to yield a flat film, and applying a heat sealable coating to at least one surface of said flat film.

The oriented films of this invention may be stabilised against thermal shrinkage by a "heat-setting" operation which involves heating the film, while held under tension, to a temperature above the highest glass transition temperature exhibited by the polymeric blend but below the melting point thereof. The heat setting operation may be effected before or after application of the heat sealable coating layer.

Coated, oriented films produced according to the present invention may vary in thickness depending on the intended application, but usually we find that films having a thickness of from 2 to 150 microns are of general utility. Films intended for use in packaging operations are suitably within a thickness range from 10 to 50 microns.

Any of the additives hereinbefore described as being suitable for incorporation into the heat sealable coating may, if desired, be incorporated into the film substrate.

The invention is illustrated by reference to the accompanying FIGURE which depicts a simplified schematic cross-sectional elevation of a portion of a heat-sealable film having a substrate layer 1 of a blend of polypropylene with an ethylene-propylene end block copolymer adhered to a heat-sealable coating layer 2 of a vinylidene chloride-acrylonitrile copolymer, by means of an intermediate anchor coating layer 3 of a copolymer of styrene, ethyl acrylate, methacrylic acid and N-(butoxymethyl)acrylamide.

The invention is further illustrated by reference to the following Examples.

EXAMPLE 1

This is a comparative Example, not according to the invention.

A granular propylene homopolymer having a melt flow index (MFI), as hereinbefore defined, of 5 g/10 minutes, was extruded at a rate of 220 kg per hour through an annular extrusion die to produce a cast polymeric tube which was cooled internally by contact with a tapered, matt-surfaced mandrel the surface of which was bathed by a downwardly flowing sheath of cold water. The outer surface of the tube was cooled by means of an external, annular cooling bath to which cold water was supplied at a rate of 3185 $dm^3h^{-1}$ (700 gallons per hour).

The cooled tube was reheated to a temperature of about 160° C., oriented by a conventional "bubble" technique — the longitudinal draw ratio being 7.4 and the transverse draw ratio being 7.7, and heat-set at 130° C., while restrained against thermal shrinkage, to yield a polypropylene film some 14 microns in thickness. Each surface of this film was subjected to a corona discharge treatment, and both surfaces were then coated with an anchor coating comprising a sulphuric acid catalysed, 6.5% by weight solids resin formed by diluting, with industrial methylated spirits, a 50% solids resin of a copolymer of styrene (38.5 parts by weight), ethyl acrylate (44.0), methacrylic acid (2.5) and N-(butoxymethyl)acrylamide (15.0) made by condensing formaldehyde with acrylamide in the presence of n-butanol. The anchor-coated film was dried in an air oven at a temperature of 80° C., subsequently over-coated on both surfaces with a heat sealable coating comprising an aqueous latex of a vinylidene chloride-acrylonitrile copolymer (88:12 by weight), then dried in an air oven at 110° C., and wound into a roll. The thickness of each anchor coating layer was about 0.125 microns, and that of each heat sealable coating layer about 2.0 microns.

The heat seal strength of the resultant film was determined by placing two layers of the film so that the vinylidene chloride-acrylonitrile copolymer coated surfaces were in contact with each other, sealing these layers together between the jaws of a Sentinel Heat Sealer (model No. 12 AS), adjusted to provide a jaw temperature 130° C., a jaw pressure of 15 psi and a dwell time of 2 seconds.

The strength of a seal was measured by cutting from the sealed-together layers of film a strip 25 mm wide and some 100 mm long, the heat seal extending across the entire width of the strip and having an area of some 25 × 25 mm. The unsealed ends of the strip were then attached respectively to a dynamometer and a gripping surface, a load was applied to the gripping surface, and the load required to separate the layers in the sealed area was recorded by the dynamometer, and expressed as a seal strength of x g/25 mm, where x was the load in grammes.

The adhesion of the vinylidene chloride copolymer coating to the anchor coated polypropylene substrate was assessed by measuring the force required to peel a strip, 10 mm wide, of the copolymer coating layer away from a sample of film which had been sandwiched between opposed strips of "J-Lar" adhesive tape, 25 mm wide, for one hour. At the expiry of one hour, a strip, 10 mm wide, is longitudinally excised from the "sandwich", and the "J-Lar" backing strip in contact with one coated surface of the film strip under test is adhered in a vertical position to a film holder attached to a dynamometer. The "J-Lar" layer adhering to the other coated surface of the film is then peeled away from the upper end of the strip, turned over through 180° and secured to a gripping member through which a tensile force is applied to remove the "J-Lar" layer, together with the coating layer, from the base of the film strip. The maximum force, measured in g/cm, required to remove the coating layer is registered by the dynamometer.

The stiffness of the uncoated, heat-set base film was assessed by measuring the 1% secant modulus (the ratio stress:strain at 1% elongation) by means of an Instron tensile testing machine.

Results, which are the average of several determinations, are shown in the accompanying table.

Table

| 1% Secant modulus kg/mm$^2$ | | Heat seal strength g/25 mm | | Coat adhesion g/cm | |
|---|---|---|---|---|---|
| MD | TD | IN | OUT | IN | OUT |
| 235 | 222 | 279 | 218 | 42.5 | 32.5 |

In the Table, IN and OUT refer respectively to the inside and outside of the roll of coated film.

EXAMPLE 2

The procedure of Example 1 was repeated using, instead of the propylene homopolymer, a blend of 80 parts by weight of the propylene homopolymer (MFI 5 g/10 minutes) and 20 parts by weight of an ethylene-propylene end block copolymer, the ethylene content of the copolymer being 5% by weight, so that the ethylene content of the blend was 1% by weight thereof.

The end block copolymer was prepared by first feeding propylene containing 0.15 mole % of hydrogen into a $C_{12}$ aliphatic hydrocarbon containing 5 m.mole/l of $TiCl_3$ and 9 m.mole of diethylaluminium chloride at 60° C. The $TiCl_3$ catalyst was prepared by reducing $TiCl_4$ with $Et_3AlCl_3$ as described in British patent No. 1,014,944. After polymerising 400 g of propylene per liter of diluent, the partial pressure was allowed to fall to 20 psi, at which stage ethylene gas was added until the total polymer contained 6% w/w of combined ethylene. After removal of catalyst residues and soluble by-products, the powder was dried and densified in an extruder with added thermal stabilizers to give granules with an MFI of 5 g/10 minutes and a combined ethylene content of 5% by weight.

Coatings identical to those of Example 1 were applied to film formed from the blend, and characteristics of the film determined in accordance with the aforementioned test methods. Results, which are the average of several determinations, are shown in the accompanying table.

Table

| 1% Secant modulus kg/mm$^2$ | | Heat seal strength g/25 mm | | Coat adhesion g/cm | |
|---|---|---|---|---|---|
| MD | TD | IN | OUT | IN | OUT |
| 239 | 216 | 470 | 350 | 52.0 | 54.0 |

In the Table, IN and OUT refer respectively to the inside and outside of the reel of coated film.

These results demonstrate that although the 1% secant modulus of the base film remains practically constant on incorporation of the ethylene-propylene end block copolymer with the propylene homopolymer, the heat seal strength and coat adhesion of the films are significantly improved thereby.

I claim:

1. A heat sealable film having improved heat seal strength comprising a polyolefin film substrate at least one surface of which is coated with a layer of a heat sealable material, wherein the film substrate is formed from a composition comprising a blend of from 75 to 85 parts by weight of polypropylene and from 25 to 15 parts by weight of a block copolymer of ethylene and propylene, the copolymer containing from 2 to 14% by weight of ethylene, based on the weight of the copolymer, and the blend containing from 0.5 to 2.1% by weight of ethylene, based on the weight of the blend.

2. A method of packaging merchandise, comprising: wrapping said merchandise in a heat sealable polyolefin film according to claim 1, and heat sealing said film to effect closure of said film package.

3. A film according to claim 1 wherein the film substrate is formed from a composition comprising a blend of 80 parts by weight of polypropylene and 20 parts by weight of a block copolymer of ethylene and propylene, the content of ethylene in the copolymer being 5% by weight, and the content of ethylene in the blend being 1% by weight.

4. A method of packaging merchandise, comprising: wrapping said merchandise in a package of heat sealable polyolefin film according to claim 3, and heat sealing said film to effect closure of said film package.

5. A film according to claim 1 wherein the polypropylene, in granular form, has a melt flow index, measured at 230° C. under a load of 2.16 kilogrammes, of from 4 to 8 grammes per 10 minutes.

6. A method of packaging merchandise, comprising: wrapping said merchandise in a package of heat sealable polyolefin film according to claim 5, and heat sealing said film to effect closure of said film package.

7. A film according to claim 1 wherein the heat sealable material comprises a copolymer of vinylidene chloride, acrylonitrile, and, optionally, one or more ethylenically unsaturated comonomers.

8. A method of packaging merchandise, comprising: wrapping said merchandise in a package of heat sealable polyolefin film according to claim 7, and heat sealing said film to effect closure of said film package.

9. A heat sealable film having improved heat seal strength comprising a polyolefin film substrate at least one surface of which is coated with a layer of a heat sealable material, wherein the film substrate is formed from a composition comprising a blend of from 75 to 85 parts by weight of polypropylene and from 25 to 15 parts by weight of a block copolymer of ethylene and propylene, the copolymer containing from 2 to 14% by weight of ethylene, based on the weight of the copolymer, and the blend containing from 0.5 to 2.1% by weight of ethylene, based on the weight of the blend, including a layer of an anchor coating resin between the film substrate and the heat sealable layer.

10. A method of packaging merchandise, comprising:
wrapping said merchandise in a package of heat sealable polyolefin film according to claim 9, and
heat sealing said film to effect closure of said film package.

11. A heat sealable film having improved heat seal strength comprising a polyolefin film substrate at least one surface of which is coated with a layer of a heat sealable material, wherein the film substrate is formed from a composition comprising a blend of from 87.5 to 60 parts by weight of polypropylene and from 12.5 to 40 parts by weight of a block copolymer of ethylene and propylene, the copolymer containing from 0.5 to 40% by weight of ethylene, based on the weight of the copolymer, and the blend containing from 0.2 to 5% by weight of ethylene, based on the weight of the blend, and including a layer of an anchor coating resin comprising a copolymer containing up to 90% by weight of styrene, up to 80% by weight of an alkyl acrylate, up to 15% by weight of methacrylic acid, and 5% to 25% by weight of an acrylamide which has been condensed with a solution of a formaldehyde in n-butanol containing from 0.2 to 3 equivalents of formaldehyde for each amide group in the copolymer, between the film substrate and the heat sealable layer.

12. A method of packaging merchandise, comprising:
wrapping said merchandise in a package of heat sealable polyolefin film according to claim 11, and
heat sealing said film to effect closure of said film package.

13. A heat sealable film having improved heat seal strength comprising a polyolefin film substrate at least one surface of which is coated with a layer of a heat sealable material, wherein the film substrate is formed from a composition comprising a blend of from 87.5 to 60 parts by weight of polypropylene and from 12.5 to 40 parts by weight of a block copolymer of ethylene and propylene, the copolymer containing from 0.5 to 40% by weight of ethylene, based on the weight of the copolymer, and the blend containing from 0.2 to 5% by weight of ethylene, based on the weight of the blend, and including a layer of an anchor coating resin comprising a 50% solids solution of a copolymer resin containing 38.5 parts of styrene, 44 parts of ethyl acrylate, 2.5 parts of methacrylic acid, and 15 parts of acrylamide which has been condensed with 5.2 parts of formaldehyde in n-butanol, between the film substrate and the heat sealable layer.

14. A method of packaging merchandise, comprising:
wrapping said merchandise in a package of heat sealable polyolefin film according to claim 13, and
heat sealing said film to effect closure of said film package.

* * * * *